(12) United States Patent
Neudorf

(10) Patent No.: US 9,775,291 B2
(45) Date of Patent: Oct. 3, 2017

(54) GAUGE WHEELS FOR A MULTI-SECTION AGRICULTURAL HEADER

(71) Applicant: BN Equipment Design Ltd., Wymark (CA)

(72) Inventor: Brent Neudorf, Wymark (CA)

(73) Assignee: MacDon Industries Ltd., Winnipeg, MB (CA)

( * ) Notice: Subject to any disclaimer, the term of this patent is extended or adjusted under 35 U.S.C. 154(b) by 99 days.

(21) Appl. No.: 14/957,058

(22) Filed: Dec. 2, 2015

(65) Prior Publication Data

US 2016/0183461 A1    Jun. 30, 2016

Related U.S. Application Data

(60) Provisional application No. 62/097,202, filed on Dec. 29, 2014.

(51) Int. Cl.
    *A01D 67/00* (2006.01)
    *A01D 41/14* (2006.01)

(52) U.S. Cl.
    CPC ........... *A01D 41/145* (2013.01); *A01D 41/14* (2013.01)

(58) Field of Classification Search
    CPC .... A01B 73/02; A01B 73/005; A01D 41/141; A01D 43/107
    USPC .......................................................... 56/208
    See application file for complete search history.

(56) References Cited

U.S. PATENT DOCUMENTS

| | | | | |
|---|---|---|---|---|
| 2,750,727 A * | 6/1956 | Wright | ................. | A01D 41/141 116/DIG. 13 |
| 4,177,627 A * | 12/1979 | Cicci | .................... | A01D 43/107 56/15.8 |
| 4,237,680 A * | 12/1980 | Hoch | ................... | A01D 43/107 56/15.9 |
| 4,845,931 A * | 7/1989 | Bruner | ................... | A01D 57/04 56/10.2 R |
| 5,243,810 A * | 9/1993 | Fox | ....................... | A01B 73/005 56/14.4 |
| 5,464,371 A * | 11/1995 | Honey | ................... | A01D 57/20 460/20 |
| 6,675,568 B2 | 1/2004 | Patterson et al. | | |
| 7,614,206 B2 * | 11/2009 | Tippery | ............... | A01D 41/144 56/15.8 |
| 7,661,251 B1 * | 2/2010 | Sloan | .................. | A01D 41/145 56/10.2 E |

(Continued)

FOREIGN PATENT DOCUMENTS

CA         2665589 A1 * 11/2010 ........... A01D 41/141

*Primary Examiner* — Arpad Fabian-Kovacs
(74) *Attorney, Agent, or Firm* — Adrian D. Battison; Ade & Company Inc

(57) ABSTRACT

A gauging system is adapted for use with a crop harvesting header of the type having a pair of wing frame portions connected to a center frame portion by a balancing linkage and which is operable in a first mode of operation by engagement of a skid plate of each wing frame portion along the ground. In one embodiment of the invention, the gauging system includes i) outer gauge wheels supporting the outer ends of the wing frame portions such that the skid plate is at a controlled distance from the ground and ii) inner gauge wheels proximate the center frame portion for supporting the inner ends of the wing frame portions such that the skid plate is at a controlled distance from the ground according to a second mode of operation of the header.

27 Claims, 14 Drawing Sheets

(56) References Cited

U.S. PATENT DOCUMENTS

| | | | |
|---|---|---|---|
| 8,245,489 B2 | 8/2012 | Talbot | |
| 9,408,346 B2 | 8/2016 | Schulze et al. | |
| 2004/0200203 A1* | 10/2004 | Dow | A01B 73/02 |
| | | | 56/375 |
| 2005/0028509 A1* | 2/2005 | Viaud | A01D 41/148 |
| | | | 56/341 |
| 2014/0041351 A1* | 2/2014 | Bollin | A01D 41/141 |
| | | | 56/10.2 E |
| 2015/0033692 A1* | 2/2015 | Schroeder | A01D 41/141 |
| | | | 56/10.2 E |
| 2015/0128552 A1* | 5/2015 | Dow | A01B 73/02 |
| | | | 56/377 |
| 2015/0271999 A1* | 10/2015 | Enns | G05B 15/02 |
| | | | 700/275 |

* cited by examiner

GAUGE WHEELS FOR A MULTI-SECTION AGRICULTURAL HEADER

This application claims the benefit under 35 U.S.C. 119(e) of U.S. provisional application Ser. No. 62/097,202, filed Dec. 29, 2014.

FIELD OF THE INVENTION

The present invention relates to a header for a combine harvester where the header includes ground engaging gauge wheels to provide stability to the header when cutting off the ground.

BACKGROUND

Headers for combine harvesters are typically mounted on the feeder house of the combine to allow some floating action of the header relative to the feeder house so that the cutter bar can rest on the ground and float over the ground responsive to ground contours in a cutting action. To optimally follow ground contours, various attempts have been made to introduce some flexibility into the header.

U.S. Pat. No. 6,675,568 by Patterson et al discloses one example of a multi-section header with a flexible crop cutting knife for this purpose. The main frame structure of the header is formed in multiple sections including a centre section and two wing sections in which each section includes a skid element along the width thereof for riding along the ground. A balancing linkage is provided to distribute a total lifting force from the combine harvester into a central lifting force lifting the central section and first and section lifting forces for lifting the wing sections. Typically 90% of the lifting force is provided by the total lifting force from the combine harvester while the remaining lifting force is provided by the ground acting on the skid elements evenly across the width of the header. The header only operates in a flexible mode, however when cutting close to the ground so that the skids ride along the ground. When in a raised mode for cutting taller crops, the center and wing sections of the frame of the header are typically fixed relative to one another so that the entirety of the header is supported spaced above the ground by the lifting forces from the combine harvester. The suspension of the header on the combine harvester however still allows for some rolling movement about a forward extending axis, such that the outer ends of the wing sections can deviate substantially from the controlled height at the center of the header even when the header deviates only a few degrees from a parallel relationship to the ground due to the length of the header.

U.S. Pat. No. 8,245,489 by Talbot discloses a height control arrangement using gauge wheels supported at opposing ends of a rigid header. The gauge wheels serve to minimize any substantial deviations from a central controlled height of the header at the outboard ends of the header, however the system is only effective when used on a rigid header.

SUMMARY OF THE INVENTION

According to a first aspect of the invention there is provided a gauging system for a crop harvesting header in which the crop harvesting header comprises:

a main frame structure extending across a width of the header for movement in a forward direction generally at right angles to the width across ground including a crop to be harvested;

a mounting assembly for carrying the main frame structure on a propulsion vehicle;

a crop receiving table carried on the main frame structure across the width of the header;

a cutter bar across a front of the table arranged to move over the ground in a cutting action and carrying a cutter knife operable for cutting the crop as the header is moved forwardly across the ground for depositing the crop onto the table;

a skid element on the main frame structure for engaging the ground in a first mode of operation of the header so as to receive lifting forces from the ground at whatever points of the skid element contact the ground tending to lift the cutter bar;

a crop transport system on the table for moving the cut crop toward a discharge location of the header;

the main frame structure including a center frame portion, a first wing frame portion and a second wing frame portion;

the first wing frame portion being connected to the center frame portion by a first pivot coupling arranged for pivotal movement of the first wing frame portion relative to the center frame portion about a first pivot axis extending in a plane parallel to the forward direction thus acting to support weight from the first wing frame portion at the pivot coupling while weight from the first wing frame portion outboard of the first pivot coupling tends to rotate the first wing frame portion about the first pivot coupling in a downward direction;

the second wing frame portion being connected to the center frame portion by a second pivot coupling arranged for pivotal movement of the second wing frame portion relative to the center frame portion about a second pivot axis extending in a plane parallel to the forward direction thus acting to support weight from the second wing frame portion at the second pivot coupling while weight from the second wing frame portion outboard of the second pivot coupling tends to rotate the second wing frame portion about the second pivot coupling in a downward direction;

the mounting assembly including a suspension system providing a total spring lifting force from the propulsion vehicle acting to support the main frame structure for floating movement relative to the propulsion vehicle such that upward pressure from the ground on the skid element in the first mode of operation, which is greater than a downward force from a part of the weight of the header unsupported by the lifting force, tends to lift the main frame structure relative to the propulsion vehicle;

the mounting assembly including a center support assembly which communicates from the total spring lifting force of the suspension system a center lifting force against the weight of the center frame portion and weight from the first wing frame portion at the first pivot coupling and weight from the second wing frame portion at the second pivot coupling;

the mounting assembly including a first interconnecting linkage which communicates from the total spring lifting force of the suspension system a first lifting force against the outboard weight of the first wing frame portion;

the mounting assembly including a second interconnecting linkage which communicates from the total spring lifting force of the suspension system a second lifting force against the outboard weight of the second wing frame portion;

the center support assembly and first and second interconnecting linkages being arranged such that the center lifting force and the first and second lifting forces vary as the total spring lifting force is varied and such that the lifting force is balanced across the width of the center and wing frame portions;

the gauging system comprising:
a pair of outer gauge wheels arranged to be supported on the first wing frame portion and the second wing frame portion respectively at respective locations which are spaced outwardly from the center frame portion for engaging the ground so as to receive lifting forces from the ground; and
at least one inner gauge wheel arranged to be supported on the main frame structure proximate the center frame portion for engaging the ground so as to receive lifting forces from the ground;
the gauge wheels being arranged to collectively support the skid element spaced above the ground in a second mode of operation of the header in which the center lifting force and the first and second lifting forces vary as the total spring lifting force is varied and the lifting force from the ground is balanced across the gauge wheels.

According to a second aspect of the present invention there is provided a gauging system for a crop harvesting header for attachment to a combine harvester in which the crop harvesting header comprises:

a main frame structure extending across a width of the header for movement in a forward direction generally at right angles to the width across ground including a crop to be harvested;

a mounting assembly for carrying the main frame structure on a feeder house of the combine harvester;

the mounting assembly including an adapter for mounting on the feeder house so as to be raised and lowered with the feeder house relative to the combine harvester and a suspension system connected between the main frame structure and the adapter such that the main frame structure is movable upwardly and downwardly relative to the adapter;

a crop receiving table carried on the main frame structure across the width of the header;

a cutter bar across a front of the table arranged to move over the ground in a cutting action and carrying a cutter knife operable for cutting the crop as the header is moved forwardly across the ground for depositing the crop onto the table;

a skid element on the main frame structure for engaging the ground in a first mode of operation of the header so as to receive lifting forces from the ground at whatever points of the skid element contact the ground tending to lift the cutter bar;

a crop transport system on the table for moving the cut crop toward a discharge location of the header;

the main frame structure including a center frame portion, a first wing frame portion and a second wing frame portion;

the first wing frame portion being connected to the center frame portion by a first pivot coupling arranged for pivotal movement of the first wing frame portion relative to the center frame portion about a first pivot axis extending in a plane parallel to the forward direction thus acting to support weight from the first wing frame portion at the pivot coupling while weight from the first wing frame portion outboard of the first pivot coupling tends to rotate the first wing frame portion about the first pivot coupling in a downward direction;

the second wing frame portion being connected to the center frame portion by a second pivot coupling arranged for pivotal movement of the second wing frame portion relative to the center frame portion about a second pivot axis extending in a plane parallel to the forward direction thus acting to support weight from the second wing frame portion at the second pivot coupling while weight from the second wing frame portion outboard of the second pivot coupling tends to rotate the second wing frame portion about the second pivot coupling in a downward direction;

the suspension system including at least one spring connected between the main frame structure and the adapter so as to provide a total spring lifting force acting to support the main frame structure for floating movement relative to the combine harvester such that upward pressure from the ground on the skid element in the first mode of operation, which is greater than a downward force from a part of the weight of the header unsupported by the lifting force, tends to lift the main frame structure relative to the combine harvester;

the mounting assembly including a center support assembly which communicates from the total spring lifting force of the suspension system a center lifting force against the weight of the center frame portion and weight from the first wing frame portion at the first pivot coupling and weight from the second wing frame portion at the second pivot coupling;

the mounting assembly including a first interconnecting linkage which communicates from the total spring lifting force of the suspension system a first lifting force against the outboard weight of the first wing frame portion;

the mounting assembly including a second interconnecting linkage which communicates from the total spring lifting force of the suspension system a second lifting force against the outboard weight of the second wing frame portion;

the center support assembly and first and second interconnecting linkages being arranged such that the center lifting force and the first and second lifting forces vary as the total spring lifting force is varied and such that the lifting force is balanced across the width of the center and wing frame portions;

a distance sensor for sensing changes in distance between a point on the main frame structure and a point on the adapter as the main frame structure moves upwardly and downwardly relative to the adapter and for generating an active distance signal proportional to the sensed changes in said distance; and an automatic header height control system which receives the distance signal from the distance sensor and acts to raise and lower the feeder house in response to the distance signal from the distance sensor so as to raise and lower the feeder house relative to the main frame structure and attempt to maintain said distance at a required set value in a first mode of operation of the header;

the gauging system comprising:
a pair of outer gauge wheels arranged to be supported on the first wing frame portion and the second wing frame portion respectively at respective locations which are spaced outwardly from the center frame portion for engaging the ground so as to support outer ends of the wing frame portions at a controlled distance from the ground in a second mode of operation of the header; and
at least one height sensor supported on the main frame structure proximate the center frame portion for sensing changes in height of the main frame structure from the ground at a location of said at least one height sensor as the main frame structure moves upwardly and downwardly relative to the ground and for generating an active height signal proportional to the sensed changes in said height;

the height signal being receivable by the automatic header height control such that the automatic header height control acts to raise and lower the feeder house in response to the height signal from said at least one sensor so as to raise and lower the feeder house relative to the main frame structure and attempt to maintain said height at a required set value corresponding to said controlled distance of the outer gauge wheels in the second mode of operation of the header.

By providing a combination of outer gauge wheels on the wings of a flexible header together with an additional gauging system for controlling height of the central section of the header in a balanced arrangement with the outer gauge wheels, a flexible header is permitted to operate in a flexible mode both when cutting crops close to the ground with the skid elements engaged with the ground, or in a raised cutting mode with the cutter bar and the skid elements spaced well above the ground.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
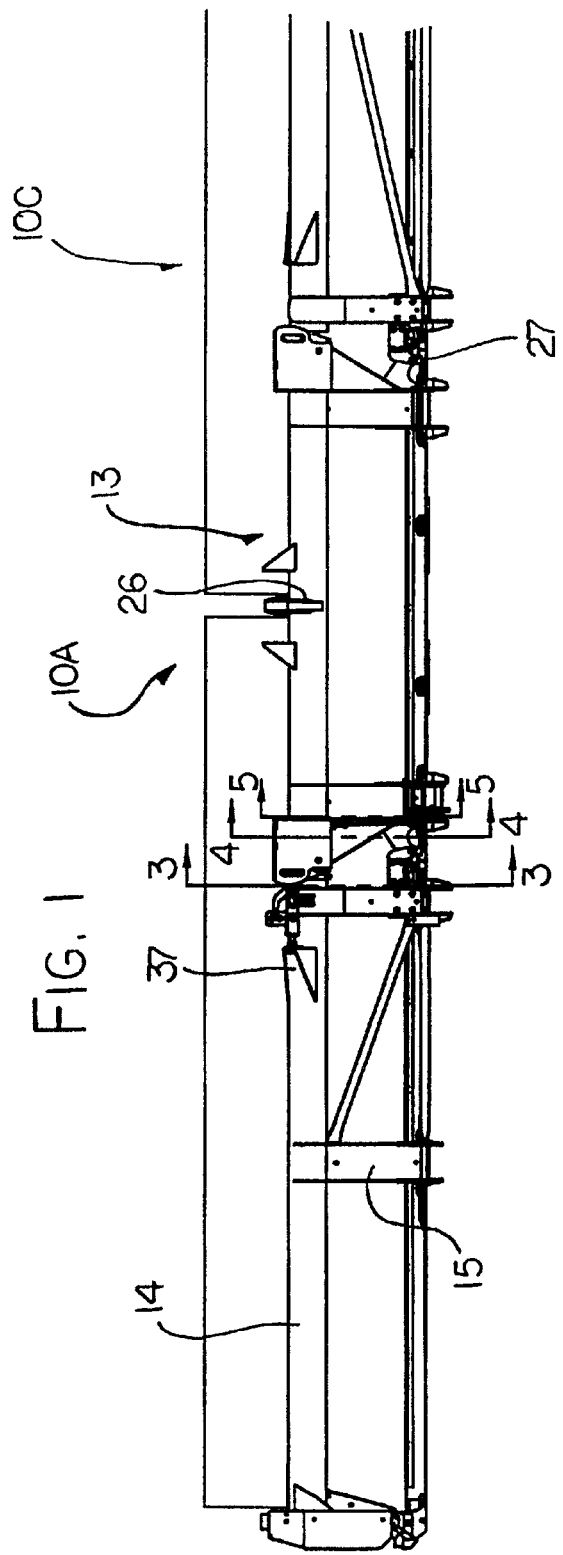
FIG. 1 is a rear elevational view of a prior art multi-section header.

Referring to the accompanying figures, there is illustrated a gauge system generally indicated by reference numeral 5.

The gauge system is particularly suited for use with an agricultural header 10 manufactured by Macdon Industries Ltd. under the model number FD70. U.S. Pat. No. 6,675,568 by Patterson et al, the disclosure of which is incorporated herein by reference discloses the general operation of the header. For convenience, FIGS. 1 through 3 from U.S. Pat. No. 6,675,568 are attached herewith and some of the description with regard to operation of the header from U.S. Pat. No. 6,675,568 is reproduced in the following.

Figure 2:
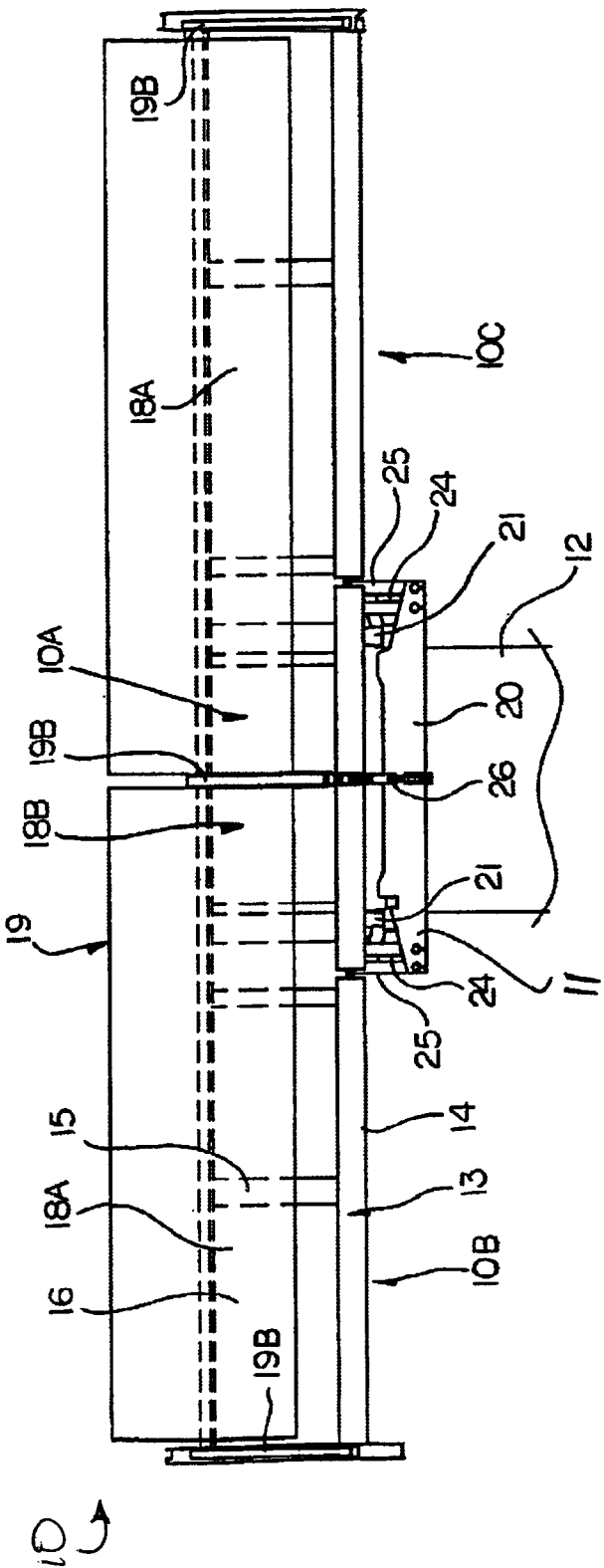
FIG. 2 is a top plan view of the prior art multi-section header according to FIG. 1.
Figure 3:
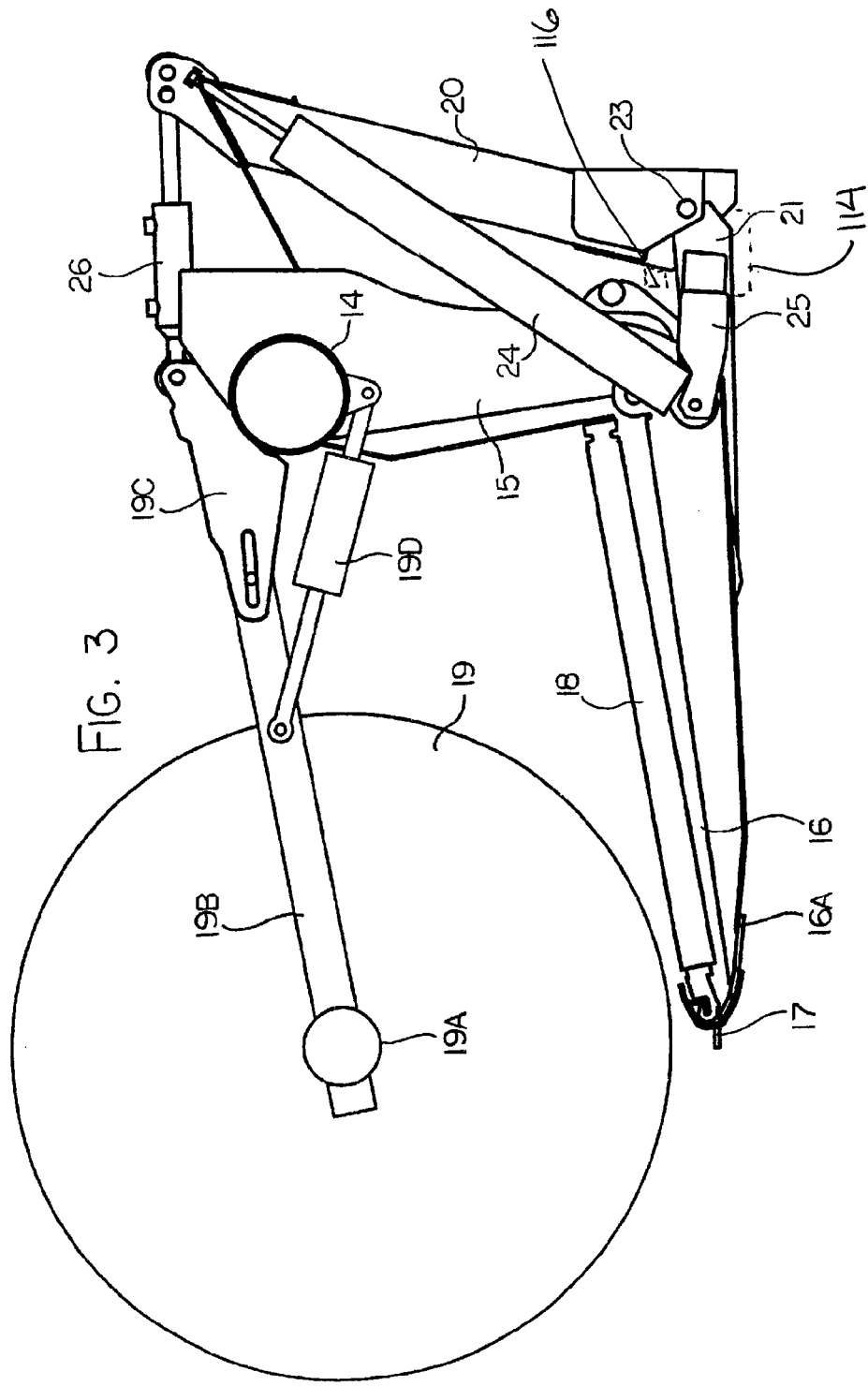
FIG. 3 is an end elevational view of the multi-section header according to FIG. 1.

FIGS. 1 and 2 show in rear elevational view and in plan view respectively the header 10 carried on an adapter 11 attached to the feeder house 12 of a combine harvester. In FIG. 1 the adapter is omitted for convenience of illustration.

The header 10 includes a frame 13 defined by a main rear beam 14 and a plurality of forwardly extending arms 15 which extend downwardly from the beam 14 and then forwardly underneath a table 16 which extends across the header. At the forward end of the table 16 is provided a cutter bar 17. On top of the table 16 is provided a draper transport system 18 which carries the crop from the cutter bar across the header to a discharge location at the feeder house 12. The draper thus include two side drapers extending from respective ends of the header inwardly toward the feeder house and a center adapter section 18B which acts to feed the crop from the side drapers 18A rearwardly to the feeder housing.

Reference is made to prior application Ser. No. 09/810, 425 filed Mar. 19, 2001 and to application Ser. No. 09/965, 119 filed Sep. 28, 2001 which disclose details of the adapter and its inter relation to the side drapers 18A, the disclosure of which is incorporated herein by reference.

The header further includes a reel 19 including a beam 19A on which is mounted a plurality of reel bats (not shown) which are carried on the beam 19A for rotation with the beam around the axis of the beam. The beam is carried on reel support arms 19B which extend from the beam rearwardly and upwardly to a support bracket attached to the transverse main beam 14. The reel arms can be raised and lowered by hydraulic cylinders 19D connected between the respective arm and the beam 14.

In the embodiment shown the reel is mounted on three arms 19B including two arms at the ends of the header and a single center arm. However additional arms may be provided so that there are four such arms with two center arms being spaced apart either side of the adapter 11. It is well known to provide an arrangement of the beam 19A and the bats which accommodate flexing movement of the reel so that one end can be higher than the other end without damaging the bats or the reel structure. Various different arrangements for accommodating such flexing movement are known and can be incorporated into the arrangement described herein, as is well known to one skilled in the art.

The adapter 11 provides a center support for the header at a center frame portion 10A and comprises a frame 20 which attaches to the feeder house 12 and carries at its lower end a pair of forwardly extending pivotal arms 21 which extend forwardly underneath respective ones of the frame members 15 of the header. The pivotal arms 21 can pivot upwardly and downwardly about a respective pivot pins 23 each independently of the other arm. Each arm is supported by a respective spring 24 carried on a respective stub arm 25 attached to the respective arm 21. Thus the spring 24 provides tension on the stub arm 25 pulling it upwardly around the pin 23 which acts to pull up the respective arm 21 and provide a lifting force underneath the header at a lifting point partway along the respective frame member 15 and underneath the draper 18 and the table 16.

At the center of the adapter is provided a link 26 which extends from the frame 20 forwardly to the central bracket 19C of the beam arm support brackets. The link 26 is provided in the form of a hydraulic cylinder which allows adjustment of the length of the cylinder thus pivoting the header forwardly and rearwardly about the support point of the arms 21 on the underside of the header. Thus the attitude of the header, that is the angle of the table 16 to the horizontal can be tilted by operation of the cylinder forming the link 26.

In addition the attitude of the header about an axis extending forwardly of the direction of movement that is at right angles to the transverse beam 14 is effected by the independent pivotal movement of the arms 21 provided by the springs 24 which act as a floatation system. In addition the whole header can float upwardly and downwardly on the springs 24 with the link 26 pivoting to accommodate the upward and downward movement and the arms 21 pivoting about the respective pin 23.

The table 16 provides behind the cutter bar 17 a skid plate 16A which is arranged to engage the ground. Thus upward force is provided from the ground which tends to lift the header taking weight off the support springs 24. In practice the springs are adjusted so that the springs act to support the majority of the weight of the header leaving a relatively small proportion of the weight to rest on the ground. Thus the header can float upwardly and downwardly as the ground provides areas of different height with one end of the header being movable upwardly independently of the other end by independent flexing of the springs 24. Thus the header tends to follow the ground level.

The arrangement of the present invention provides an improvement by which the header is formed in a number of sections which are independently pivotal each relative to the next and in which adjustment of the lifting force provided by the springs 24 is transferred to each of the sections proportionally so that each section can float upwardly and downwardly and each section applies a force to the ground which is proportional to the total force of the whole header.

Thus the beam 14 is divided into a number of separate pieces depending upon the number of sections of the header. In the embodiment shown there are three sections including a center frame portion or section 10A carried on the propulsion vehicle by the adapter or center support 11, a first wing frame portion or section 10B and a second wing frame portion or section 10C. The center section 10A is mounted at the adapter so that the arms 21 extend into engagement with the center section. The wing sections are pivotally connected to the center section such that each can pivot upwardly and downwardly about a respective pivot axis generally parallel to the direction of movement.

Thus the beam 14 is split into three portions each co-operating with a respective one of the sections 10A, 10B and 10C and defining a main beam therefor. Each section of the beam 14 includes respective ones of the frame members 15 which support the respective portion of the table. Thus as best shown in FIG. 1, there is a break between the beam sections 14 of the center section 10A and one wing section 10B. The end most frame member 15A of the wing section 10B is arranged at the break. The end frame member 15B of the center section 10A is spaced inwardly from the break leaving space for a pivot coupling 27 extending from the frame member 15A to the frame member 15B and defining a pivot pin 27A lying on the pivot axis between the wing section 10B and the center section 10A. In a rear elevational view, the cutter bar 17 is also visible underneath the header at the forward end of the frame members 15 and at the front of the table 16.

In the embodiment shown the cutter bar 17 is split at a junction lying along the axis of a hinge pin so as to provide a pivot within the cutter bar allowing the cutter bar to bend at the junction.

In an alternative arrangement (not shown) the cutter bar can be formed in a manner which allows it to flex on the axis of the pin thus avoiding the necessity for a break in the cutter bar.

The cutter bar is of conventional shape including a U shaped member with generally horizontal legs and a front curved nose to which is attached the knife support flange of a conventional nature. The knife support flange includes a plurality of holes for mounting conventional knife guards.

A bridging link is connected across the break so as to hold the sections of the cutter bar 17 aligned while the pivotal movement occurs. The link comprises a plate welded to one part of the cutter bar with the link or plates spanning the break and extending to a pin which is welded to the other part of the cutter bar with the link being held in place by a nut.

Thus the two sections 10A and 10B are supported each relative to the other for pivotal movement of the wing section 10B about an axis extending through the hinge pin and through the break in the cutter bar 17 so that the wing section is supported at its inner end on the center section but can pivot downwardly at its outer end so that the weight at the outboard end is unsupported by the center section and causes downward or counter clockwise pivotal movement of the wing section 10B.

The wing section 100 is mounted in an identical or symmetrical manner for pivotal movement about the other end of the center section 10A. The amount of pivotal movement allowed of the wing section relative to the center section about the axis of the pivot pin is maintained at a small angle generally less than 6° and preferably less than 4° as controlled by suitable mechanical stop members which are provided at a suitable location with the required mechanical strength to support the wing frame section against upward or downward movement beyond the stop members. Suitable stop members can be designed by a person skilled in the art and the details of the stop members are not described herein.

Figure 4:
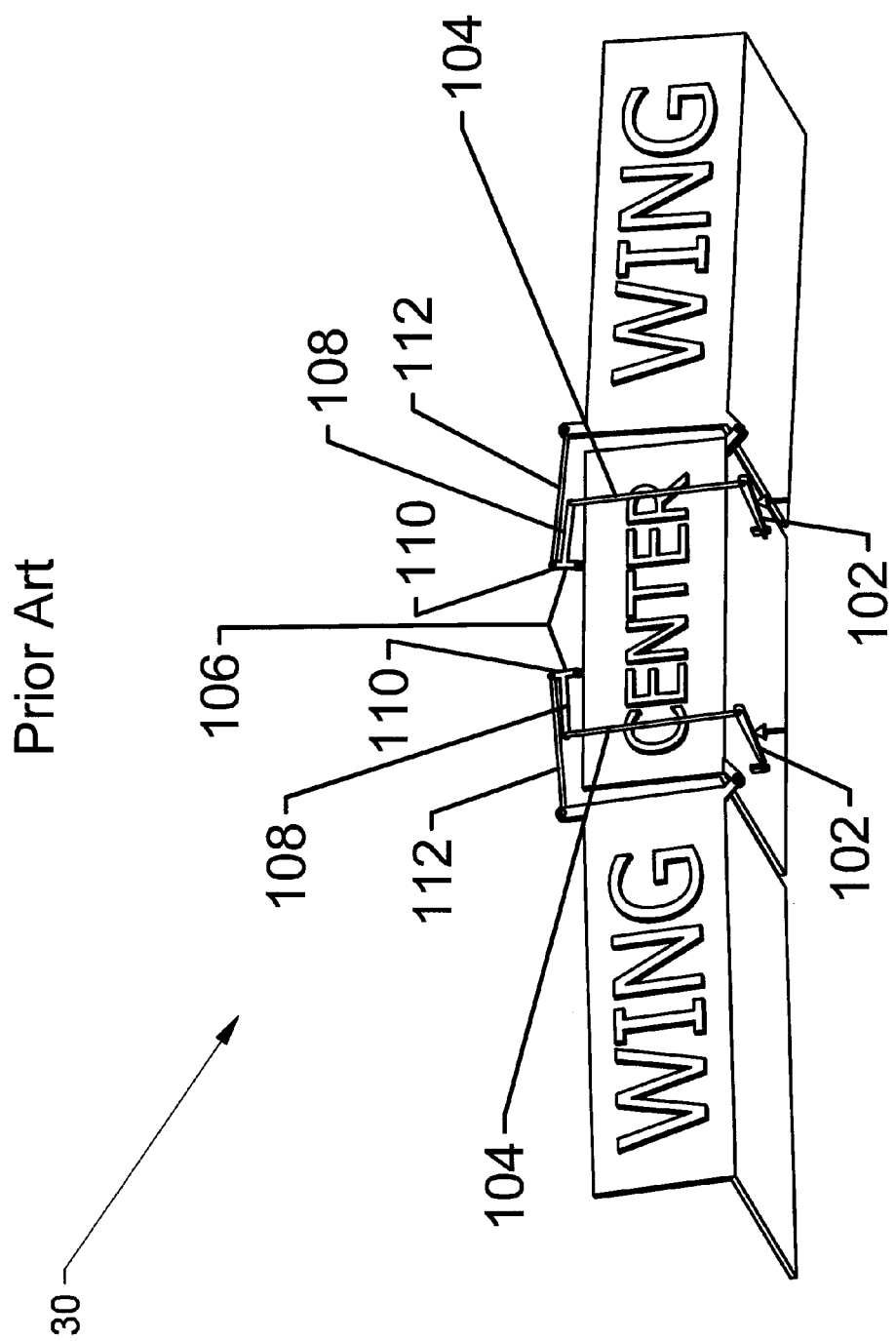
FIG. 4 is a schematic representation of the balancing linkage of the multi-section header according to FIG. 1.
Figure 5:
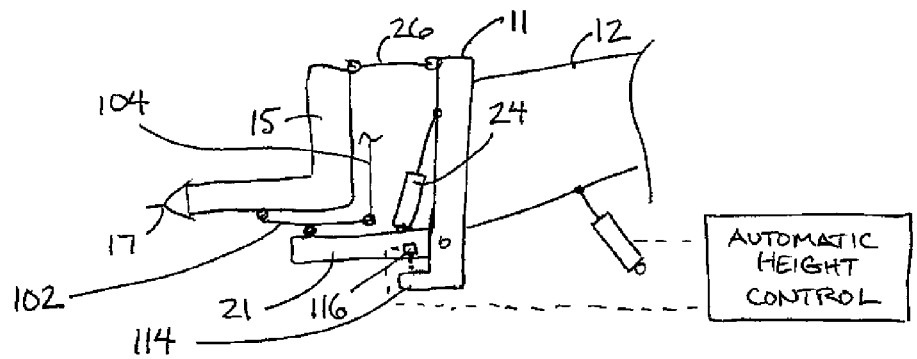
FIG. 5 is a schematic elevational view of the balancing linkage in relation to the suspension system supporting the header according to FIG. 1 on the feeder house of a combine harvester.
Figure 6:
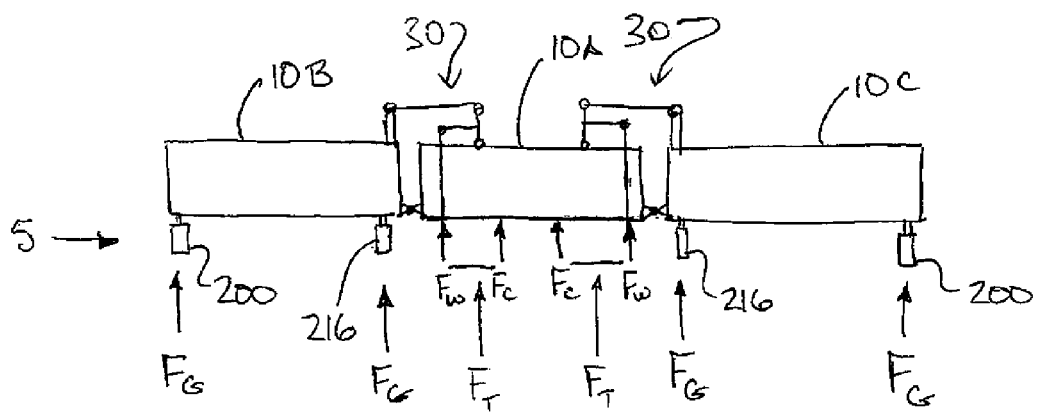
FIG. 6 is a schematic representation of the lifting forces on the header according to FIG. 1 when a gauge system according to a first embodiment of the present invention is applied to the header.
Figure 7:
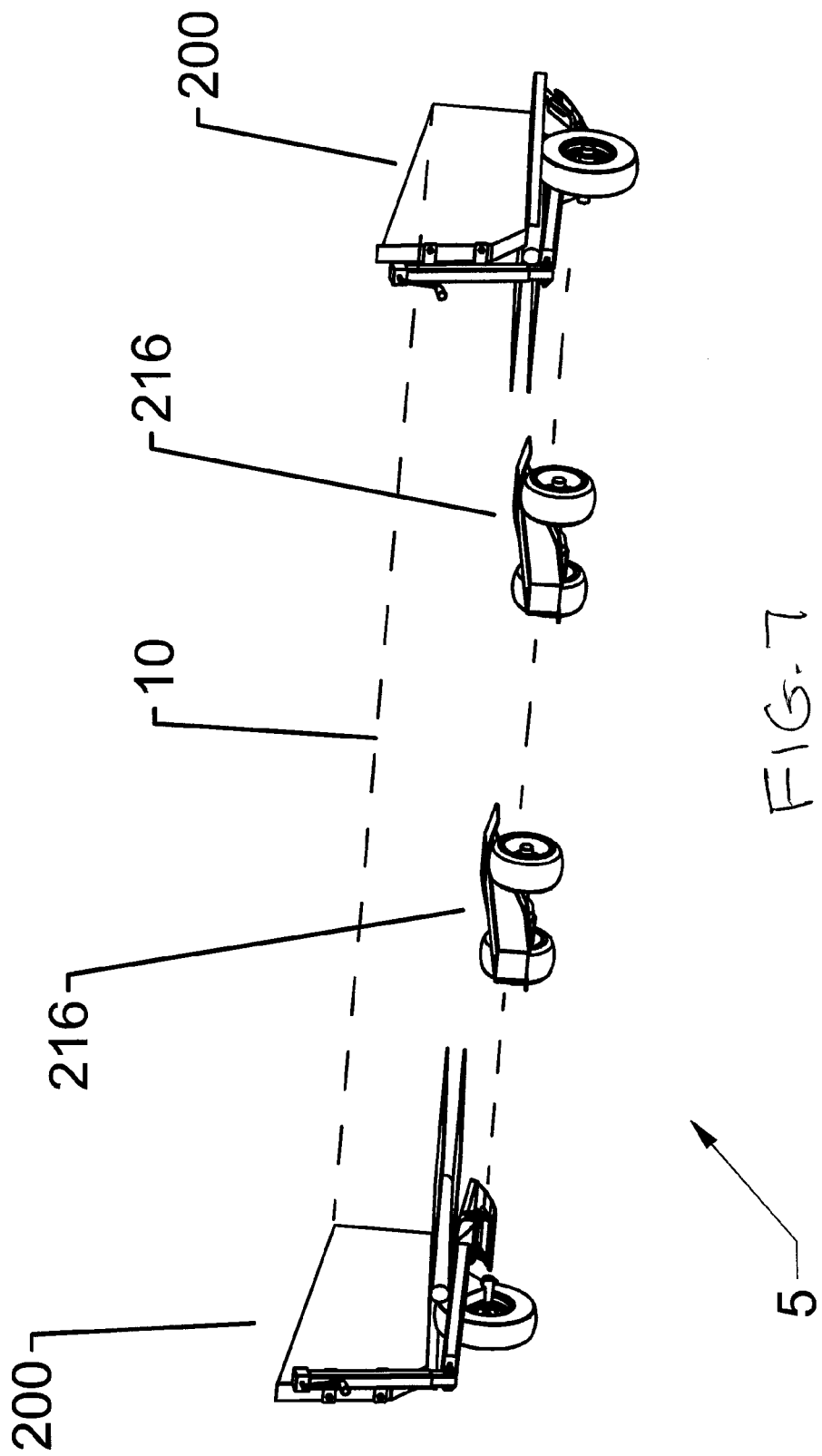
FIG. 7 is a perspective view of the first embodiment of the gauge system according to FIG. 6.
Figure 8:
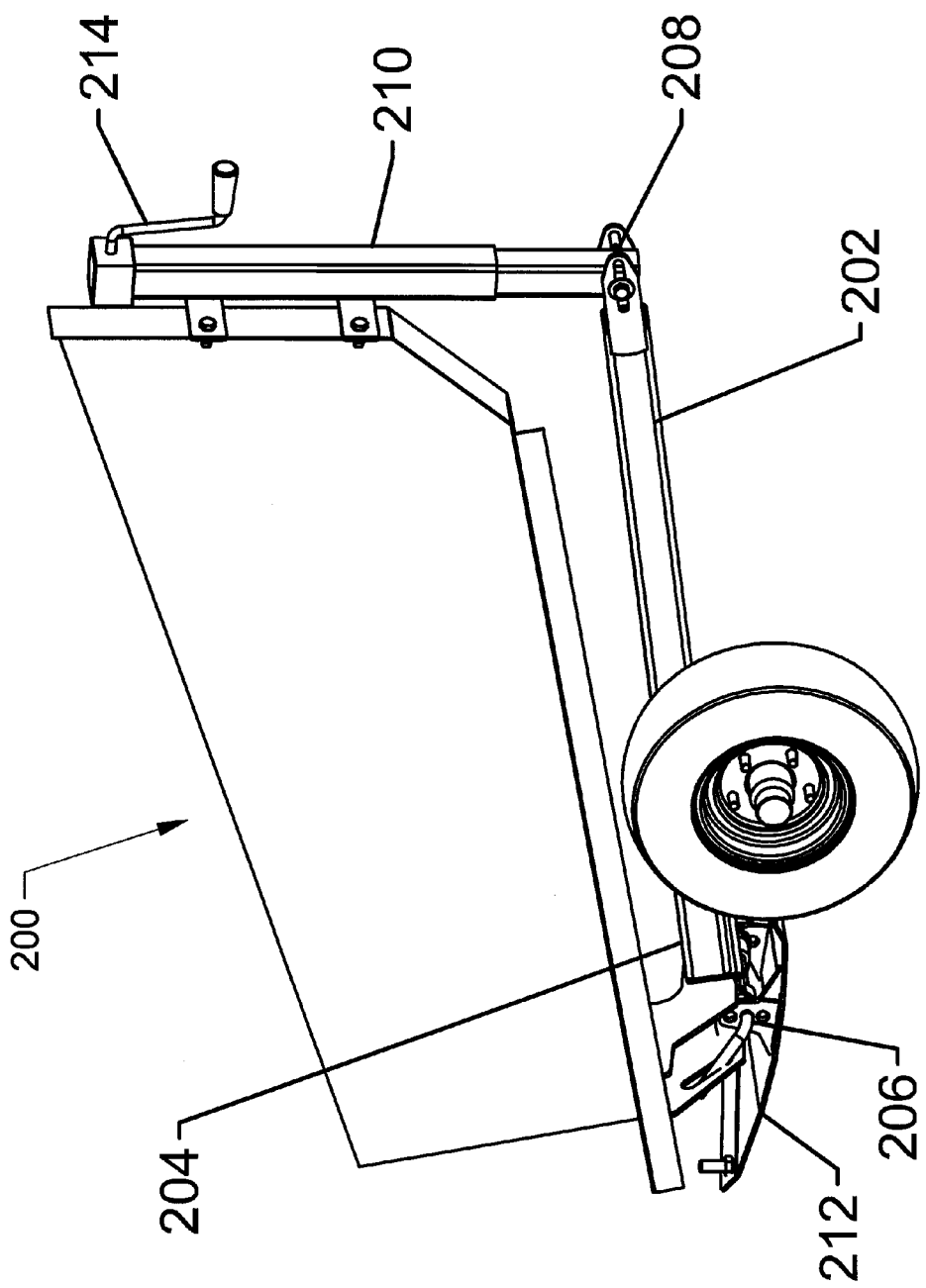
FIG. 8 and FIG. 9 are perspective views of one of the outer gauge wheels of the gauging system according to FIG. 6.
Figure 9:
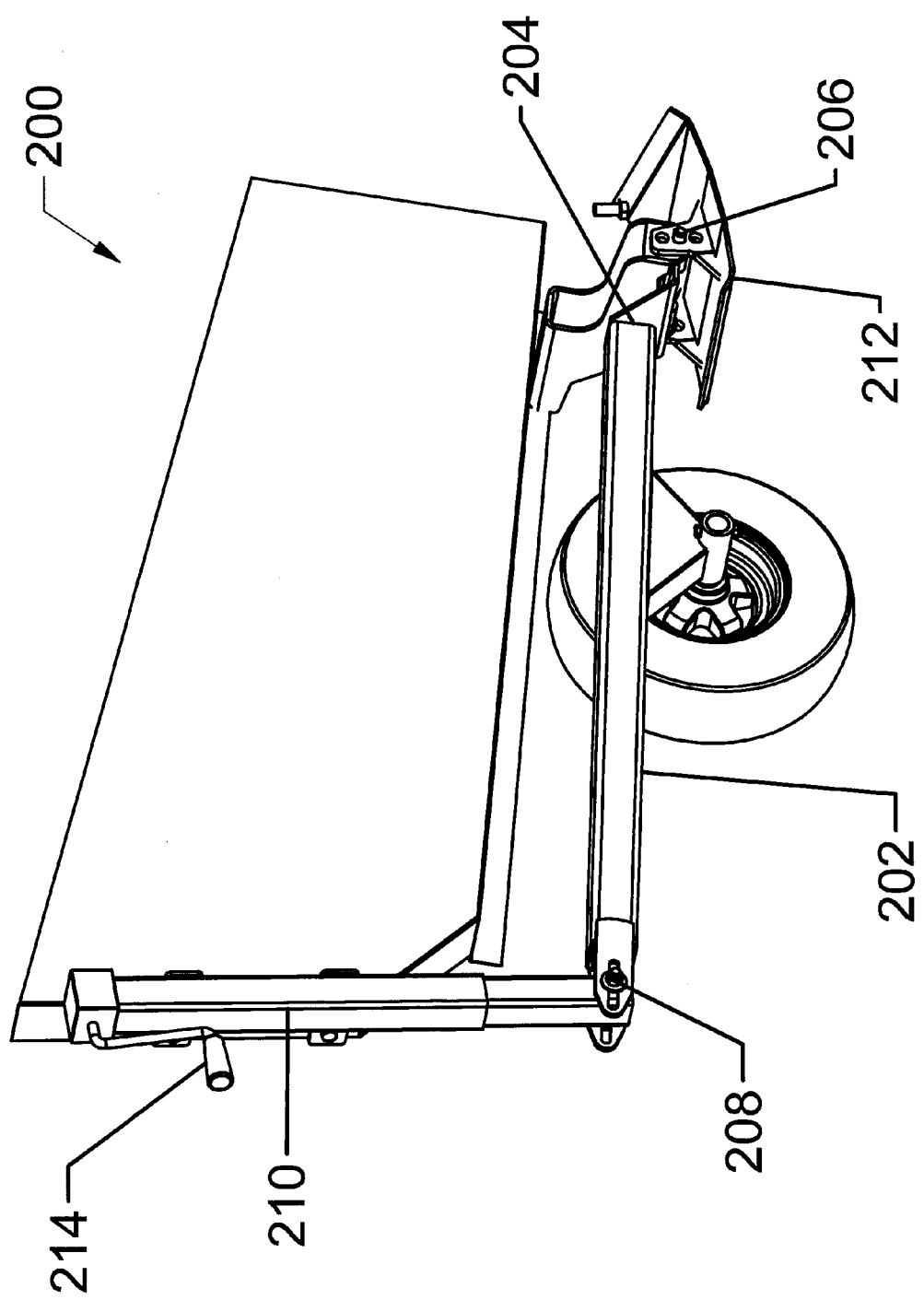
Figure 10:
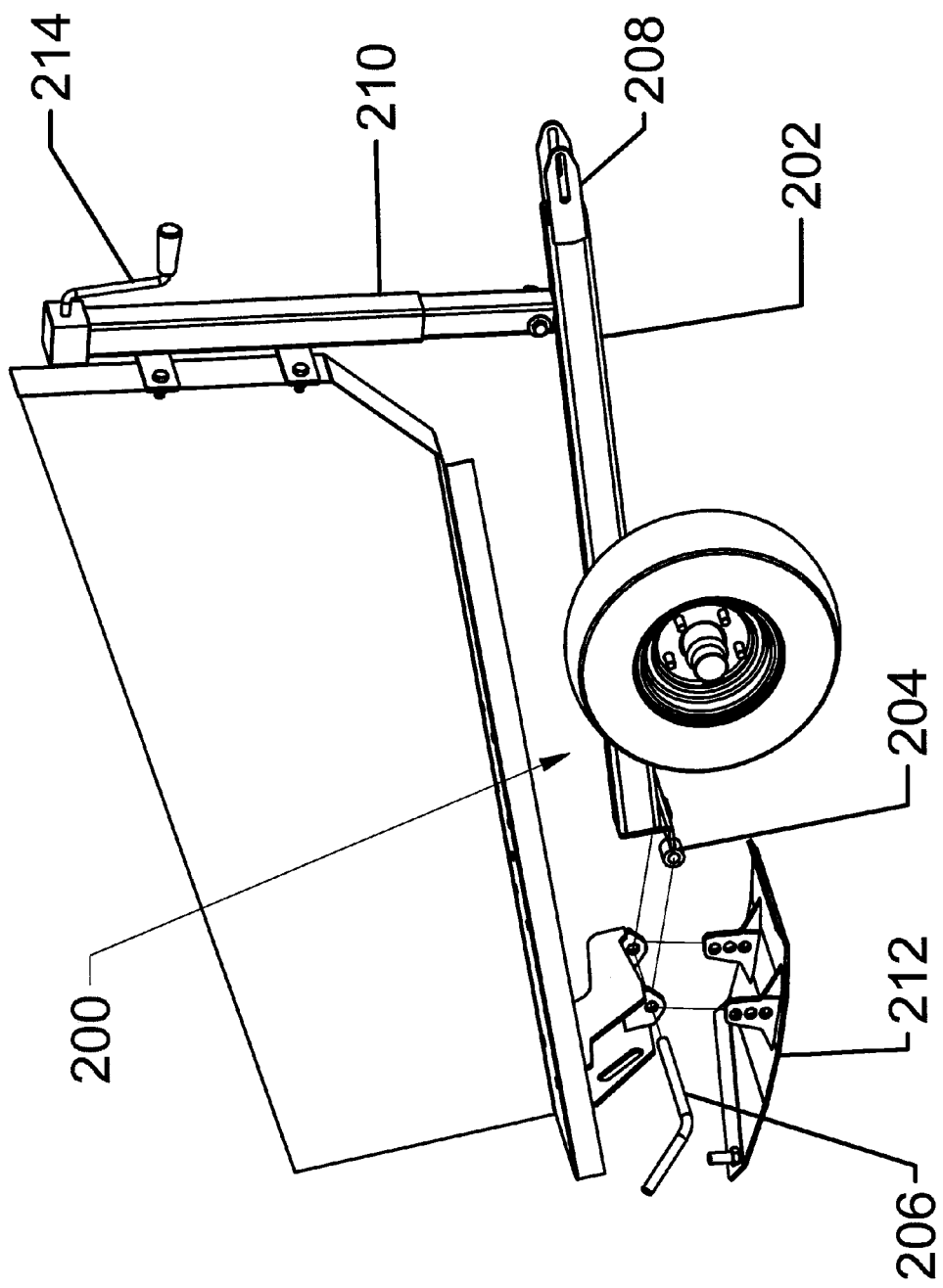
FIG. 10 is an exploded perspective view of the outer gauge wheel of FIGS. 8 and 9.
Figure 11:
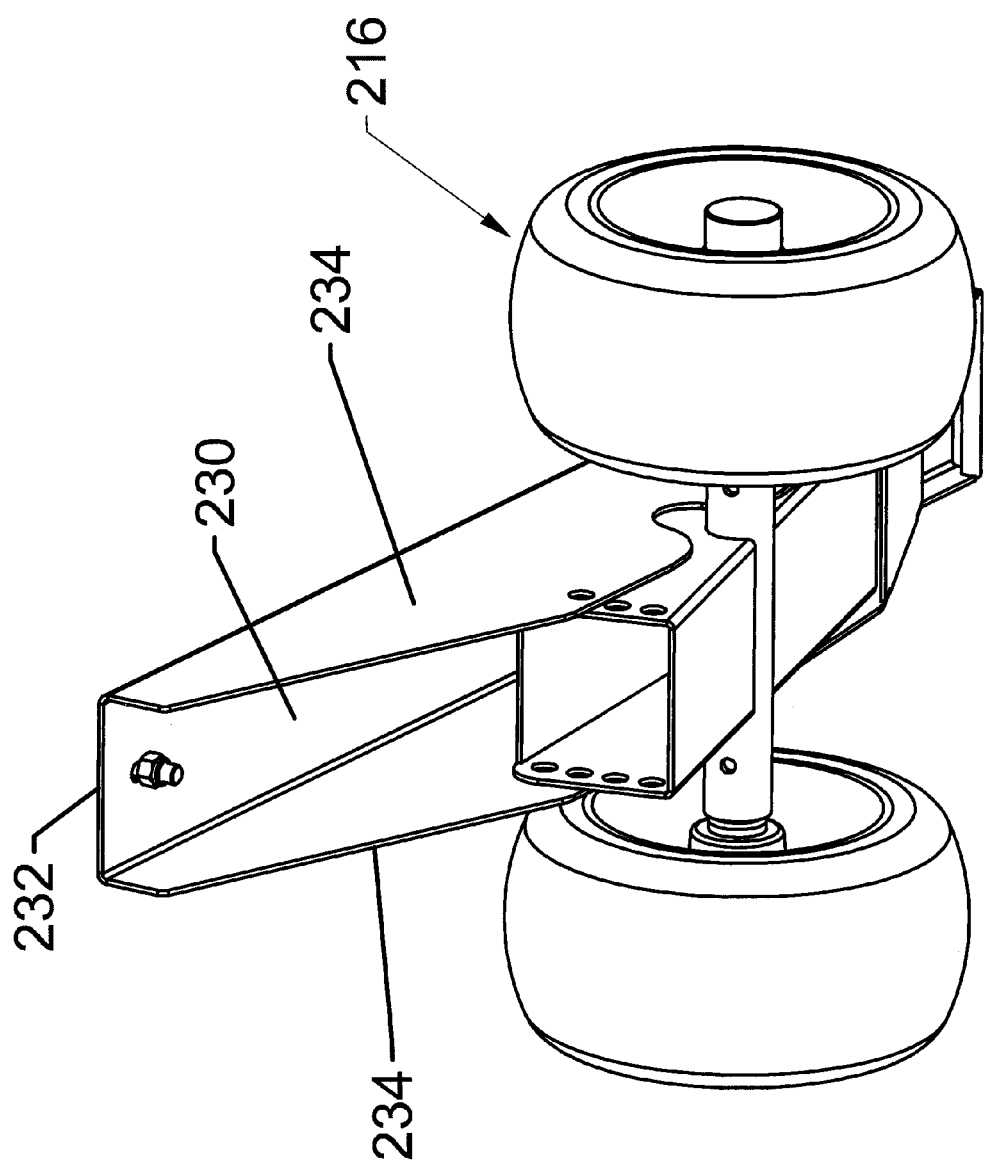
FIG. 11 is a perspective view of one of the inner gauge wheels according to the gauge system of FIG. 6, shown separated from the header.
Figure 12:
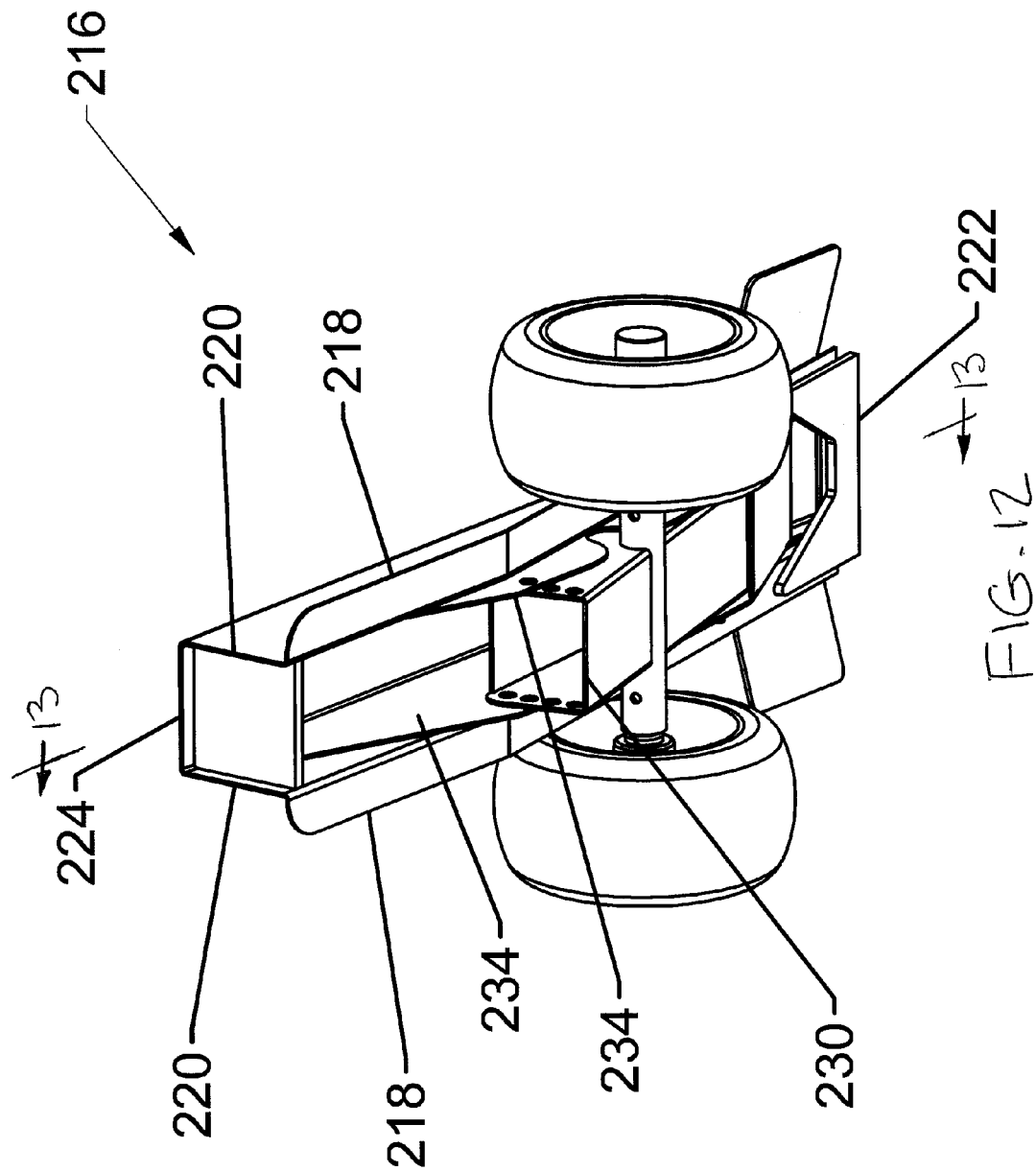
FIG. 12 is a perspective view of the inner gauge wheel of FIG. 11 shown supported on a respective mounting location on the header.
Figure 13:
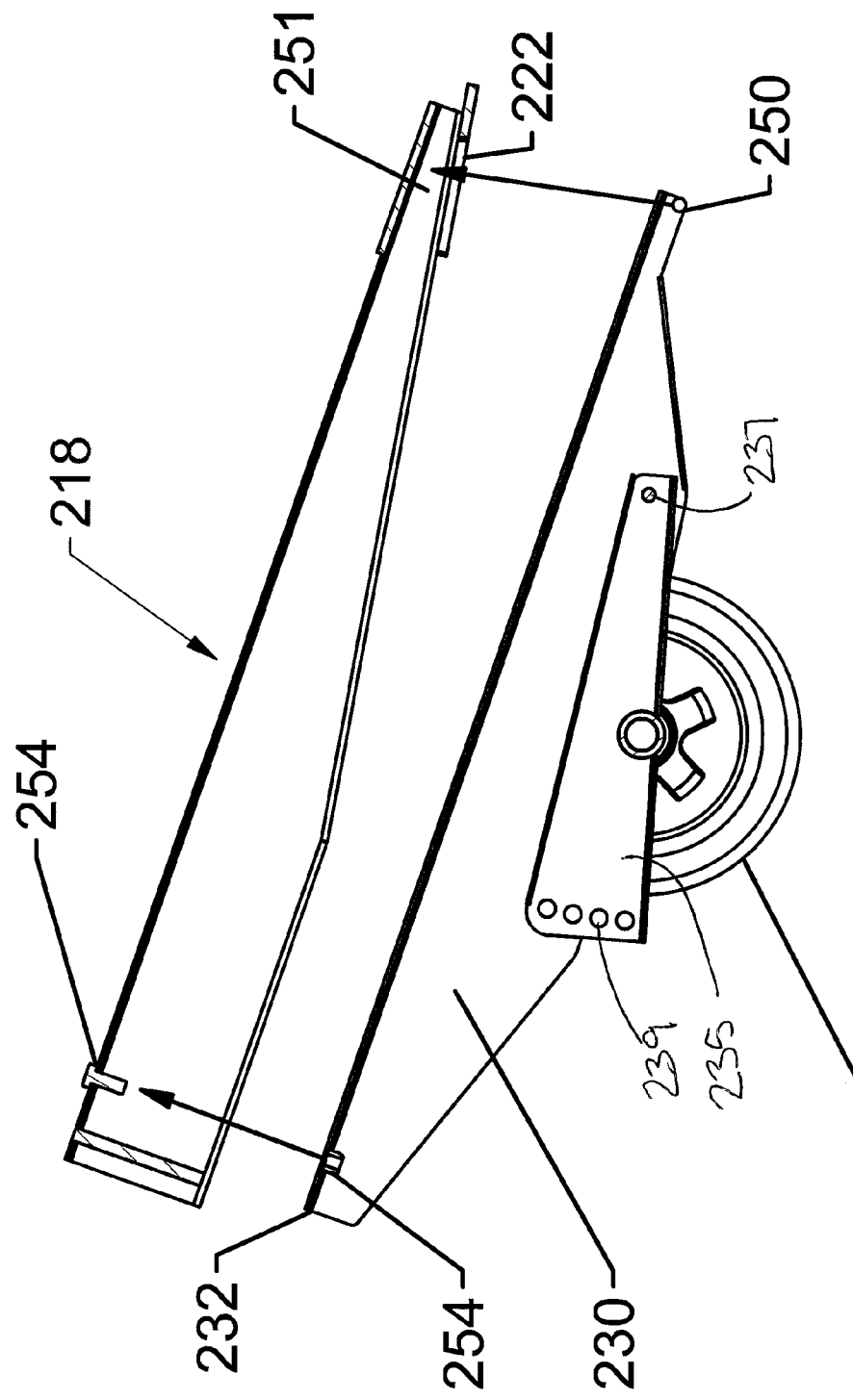
FIG. 13 is a sectional view generally along the line 13-13 of FIG. 12 with the inner gauge wheel shown separated from its mounting location on the header.
Figure 14:
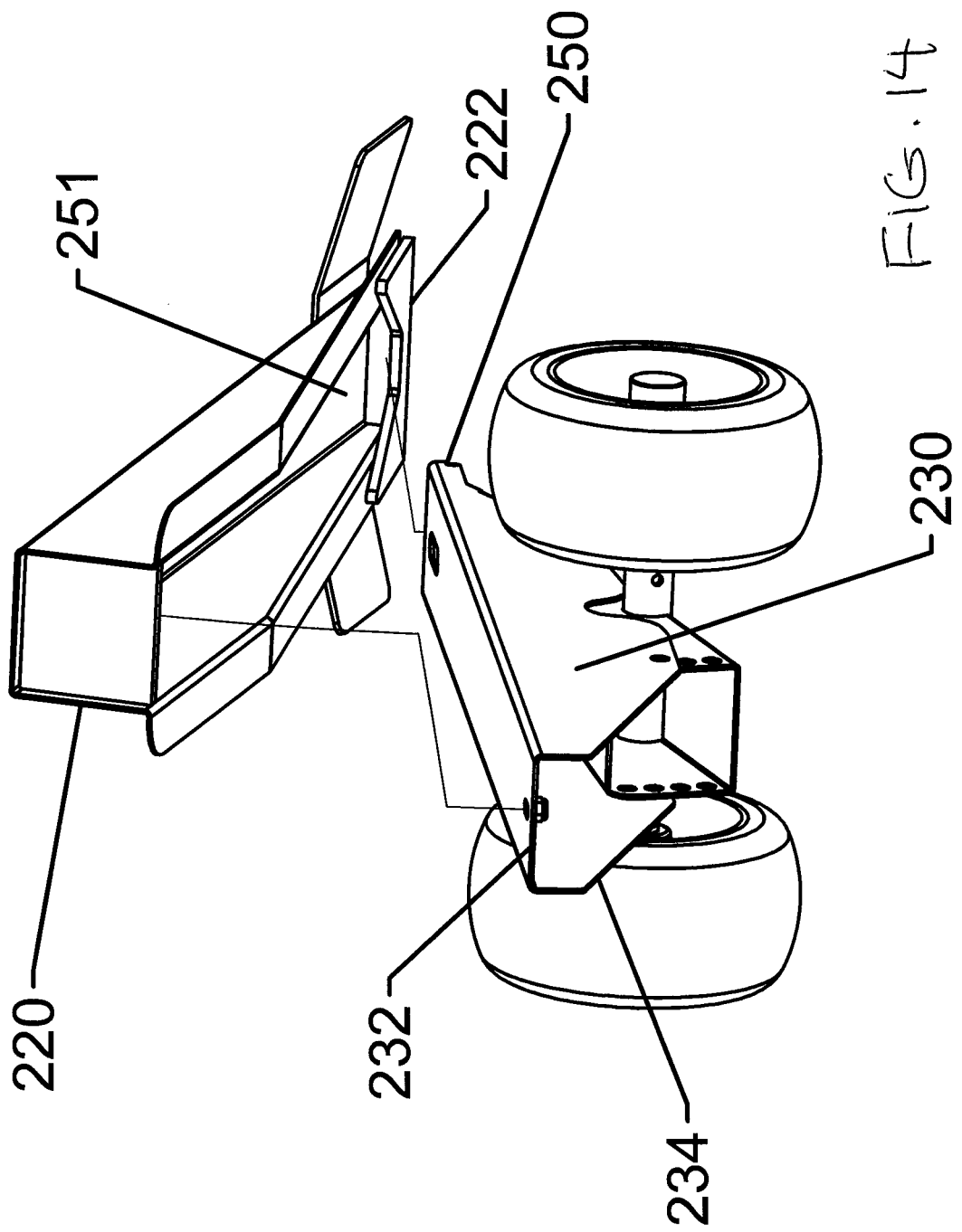
FIG. 14 is a perspective view of the inner gauge wheel of FIG. 11 shown separated from its mounting location on the header.

The outboard weight of the wing section 10B is supported on an interconnecting linkage 30 which communicates that weight from the inner end of the beam 14 of the section 10B through to the support for the center section 10A at the springs 24. The linkage is shown particularly in FIGS. 4 and 5 as described in further detail below.

In general the linkage operates to transfer the outboard weight of the wing section inwardly to the center section and at the same time to balance the lifting force provided by the springs 24 so that it is proportionally applied to the center section and to the wing section.

Thus in general the header is attached to the combine feeder house using the float system described previously that supports the header so that it can be moved up when a vertical force about 1% to 15% of its weight is applied to the cutter bar from the ground. The reaction of the float linkage that typically supports 85% to 99% of the header weight on the header is used to balance the weight of the wings.

The system is designed so that if the operator sets the float so that the float system supports 99% of the header weight then the remaining 1% will be evenly distributed across the cutter bar. If the operator changes the float so that 85% is supported by the combine harvester then the remaining 15% would also be evenly distributed across the cutter bar without the operator making adjustments. Thus, not only is the total lifting force to each sections varied in proportion to the total lifting force but also that lifting force on each section is balanced across the width of section. As the sections are rigid between the ends, this requires that the lifting forces be balance between the ends to ensure the even distribution across the cutter bar of each section and thus of all the sections. This provides an arrangement in which the force required to lift the header is the same force at any location along the length of the cutter bar, whether that location is at the center section, at a junction between the center section and the wing section or at the wing section. This is achieved in this embodiment by the balancing system which transfers lifting force between the sections with the forces being balanced by a balance beam of the linkages 30.

The header frame sections and the reel sections are hinged and supported so that the reel will stay in approximately the same position relative to the cutter bar. Thus the balance beam as described in more detail hereinafter balances the lifting force applied to the ends of the center section relative to the lifting force which is applied to the outboard weight of the wing section so that the lifting force is even across the width of the header. Thus if a lifting force is applied by the ground or any other lifting mechanism for example merely manually lifting the header at a particular location across its width, that would cause the header to rise at that point and to fall at other points. The amount of force necessary to lift the header at that point will be the same as it is at other points and this lifting force can be varied for the total header and proportioned across the width of the header automatically by the balance beams as described hereinafter.

It will be appreciated that the inboard weight of the wing section is transferred through the pivot 27 to the outboard end of the center section and that weight is transferred directly to the balance beam. Also the outboard weight of the wing section is transferred through the linkages 30. Yet further a lifting force from the arm 21 is applied to the balance beam.

The whole support assembly including the linkages 30, the lift arm 21 and the springs 24 are arranged to provide a floating movement for each of the first and second frame portions that is the center and wing frame portions relative to each other and relative to the propulsion vehicle such that upward pressure from the ground on the skid element 16A which is greater in a downward force for a part of the weight of the header and supported by the lifting force tends to lift each of the center and wing frame portions relative to the propulsion vehicle.

The balance beam arrangement is arranged such that the first and second lifting forces $F_w$ are varied proportionally as the total lifting force $F_T$ is varied.

The height of the header is primarily controlled by controlling the height of the feeder house 20 of the combine harvester relative to the ground using a height control mechanism 100. Typically the feeder house is pivotally supported on a main frame of the combine harvester and an actuator member is mounted between the feeder house and the main frame to raise and lower the feeder house.

The height of the main structure of the header is in turn supported for up and down movement relative to the adapter 11 by supporting the main frame structure on the pivot arms 21 which are supported for floating movement by the springs 24 by providing a total spring lifting force to the header. The linkages 30 in turn distribute this total spring force into a center lifting force $F_c$ which provides lift to the center frame section and the inboard ends of the wing frame sections pivotally coupled thereto as well as a first lifting force and a second lifting force acting upon the first and second wing frame sections respectively in a direction intending to cause the outboard ends of the wing frames to be raised upwardly.

The linkages 30 supporting the main frame structure on the pivot arms 21 comprises two balance linkages associated with the two pivot arms respectively. Each balance linkage includes a balance beam 102 pivotally supported at an intermediate location between front and rear ends on the forward ends of the pivot arms 21. The forward ends of the two balance beams 102 are pivotally connected to respective locations on the center section of the main frame structure at transversely spaced apart locations. The forward ends of the balance beams 102 serve to provide the center lifting force $F_c$ to the main frame structure. The opposing rear ends of the two balance beams 102 provide the first and second lifting forces $F_w$ to the first and second wing frame sections.

More particularly, the rear end of each balance beam 102 is pivotally connected to an upright compression link 104 which extends upwardly from the balance beam 102 below the main frame structure to a top end in proximity to a top end of the main frame structure. Each balance linkage further includes a bell crank 106 pivotally supported on the main frame structure adjacent the top end in which the bell crank includes a first lever 108 pivotally coupled to the top end of the respective compression link 104 and a second lever portion 110 extending upward to a pivot connection with a respective tension link 112.

Pivotal connection of the second lever 110 with the respective tension link 112 is located substantially directly above the pivotal connection of the bell crank to the main frame structure such that an upward force acting on the compression link 104 tends to rotate the bell crank in a direction corresponding to a laterally inward tension on the tension link 112 which is pivotally coupled at its outer end to a respective one of the wing frame sections which tends to pivot the wing frame section in a direction about its pivotal coupling to the center frame section in a direction corresponding to the outboard and of the wing frame section being raised upwardly.

The balance linkages 30 serve to balance the total lifting force provided by the combine harvester through the pivot arms 21 to the center lifting force at the forward ends of the balance beams 102 and the first and second lifting forces at the rear ends of the balance beams so as to vary the lifting forces as the total lifting force varies and so as to balance the lifting forces from the ground applied along the length of the skid element.

The header further includes a stop member 114 which is arranged to limit downward movement of the main frame structure of the header relative to the adapter. A distance sensor 116 is provided for sensing a distance of a point on the header which moves with the header in suspension movement relative to the bottom stop 114 which is stationary relative to the combine harvester. The distance sensor therefore generates a signal indicative of the sensed changes in the measured distance. The height control mechanism 100 which is arranged to raise and lower the feeder house of the combine harvester, receives the signal from the sensor 116 as an input and is automatically operated so as to attempt to maintain the sensed distance at a required set value. The set value is selected so that the header is free to float between the bottom stop and the upper limited movement both upwardly and downwardly to accommodate changes in ground height.

The gauge system 5 according to the present invention is particularly suited for use with the above described header 10 to permit the header to operate in a balanced manner with the wing sections floating relative to the center section when operating at a raised cutting height with the cutter bar and skid member 16A supported well above the ground.

Although two embodiments are shown in the accompanying figures, the common features of the two embodiments will first be described.

In each instance the gauge system according to the present invention includes a pair of outer gauge wheels 200 arranged to be supported on the outboard ends of the two wing frame sections of the main frame structure of the header so as to be adjustable in height relative to the main frame structure. Each outer gauge wheel is supported on a longitudinal frame member 202 which extends generally in the forward direction between a front end 204 pivotally coupled to an existing mounting pin 206 of the header to a rear end 208 which is coupled to the wing frame structure by a telescoping member 210 extending upwardly from the frame member 202 to the frame structure of the header spaced thereabove.

The telescoping member 210 includes an outer tube which is fastened to respective fastener locations at the outer end of the wing frame section. An inner member is telescopically received within the outer tube for upright linear sliding movement. By pivotally connecting the rear end 208 of the frame member 202 to the bottom end of the inner tube, the height of the rear end of the frame member can be adjusted relative to the frame structure of the header which in turn adjusts the height of the outer gauge wheel which is supported at a central location along the frame member for rolling movement in the forward direction.

The pin location 206 comprises a laterally oriented mounting pin which serves to adjustably couple a skid shoe 212 to the bottom side of the frame structure at a location spaced rearwardly of the main skid element extending alongside the cutter bar. The front end of the frame member thus defines a pair of laterally spaced mounting apertures therein which receives the existing mounting pin 206 of the header frame therethrough in a mounted position.

A mechanical height adjustment mechanism 214 is mounted internally within the outer tube of the telescoping member with an external handle permitting an operator to manually set the height of the inner tube relative to the outer tube of the telescoping member to adjust the height of the rear end of the frame member and the outer gauge wheel supported on the frame member.

The height of the gauge wheel relative to the frame structure defines a controlled height of the cutter bar of the wing frame section spaced above the ground at the outer end thereof. When the outer gauge wheels are mounted in position on the outer ends of the header, lifting forces from the ground $F_G$ are received through the gauge wheels in rolling engagement with the ground instead of through the skid element extending along the wing frame sections as in the prior art arrangement.

Turning now more particularly to the first embodiment of FIGS. 6 through 14, the gauge system in this instance further includes a pair of inner gauge wheels 216 which are selectively mounted to the bottom side of the first and second wing frame sections respectively, at the inner ends thereof so as to be approximate to the center frame section.

At the mounting location of each inner gauge wheel, the header includes an existing support frame 218 formed by an inverted channel member having two side flanges 220 which are upright and in the forward direction at laterally spaced positions. A toe plate 222 spans between bottom edges of the side flanges 220 adjacent the front ends thereof so as to be immediately rearward of the main skid element 16A at the front end of the wing frame sections.

The side flanges 220 are connected by a top flange 224 at the rear end thereof. The bottom edges of the side flanges include a horizontal flange portion in the forward working direction.

A pocket 251 is defined at the front end of each channel immediately above the toe plate 222, between the toe plate 222 below and the top flange 224 above, as well as between the two side flanges 220 at laterally opposing sides.

Each inner gauge wheel 216 is supported on a longitudinal frame member 230 which includes a top flange 232 spanning the full length of a frame member in a horizontal orientation between a front end which fits within the pocket 251 defined above the skid plate 222 and an opposing rear end. The width of the top plate defines the width of the frame member and substantially occupies the full width between the two side flanges 220. The rear end of the top flange 232 is arranged to be abutted adjacent to the bottom side of the top flange 224 of the respective support frame 218 to permit securement thereto by a suitable threaded fastener 254. By interlocking the front end 250 of the frame member 230 in the pocket 251 above the front toe plate 222 and fastening the rear end 232 to the top flange, the frame member 230 supporting the respective inner gauge wheel 216 thereon is supported in fixed relation to the main frame structure of the header in use, while enabling ready separation from the header by releasing the fastener 254 subsequent to use.

The longitudinal frame member 230 further includes two side flanges 234 extending downwardly from opposing longitudinally oriented sides of the top flange 232 so that the two side flanges 234 are laterally spaced and oriented in the forward direction.

A height adjustment member 235 is received between the side flanges 234 of the longitudinal frame member 230 which is elongate in the longitudinal direction of the frame member 230 between front and rear ends. The front end of the height adjustment member 235 is pivotally supported between the side flanges 234 at a pivot pin 237 having a laterally oriented axis such that the trailing rear end can be displaced upwardly and downwardly relative to the frame member 230 by the pivotal connection at the front end.

The inner gauge wheels are supported at laterally opposing sides of the frame member 230 by being supported at opposing ends of an axle mounted at an intermediate location between front and rear ends on the height adjustment member 235. A series of co-operating mounting apertures 239 in the side flanges 234 of the frame member 230 and the sides of the height adjustment member 235 received therebetween receive a locking pin or fastener therethrough to permit the respective inner gauge wheels 216 to be supported on an axle connected between the two side flanges at a selected one of a plurality of different mounting locations corresponding to different heights of the inner gauge wheel relative to the main frame structure.

The inner gauge wheels function similarly to the outer gauge wheels by rolling along the ground to support the skid member and the cutter bar at a controlled distance spaced above the ground corresponding to the controlled distance to which the outer gauge wheels are set. The inner gauge wheels receive lifting forces from the ground tending to lift the center section and the inboard ends of the wing frame sections pivotally coupled to the center section.

By supporting the wing frame sections on the inner and outer gauge wheels as described above, the gauge wheels serve to collectively support the entirety of the skid element across the front end of the header at the controlled distance spaced above the ground as determined by the height setting of the gauge wheels. The header is operated at a raised cutting height in a flexible, balanced mode substantially identically to the manner described above at a lowered cutting height with the skid element engaging the ground, however, in this instance all the lifting forces from the ground $F_G$ are instead transmitted through the gauge wheels instead of the skid element. The balance linkages continue to operate such that the majority of the lifting force to support the header is provided by the total string lifting force $F_T$ of the pivot arms 21 which is balanced by the linkages 30 so that the central lifting force $F_C$ and the first and second lifting forces $F_W$ as applied to the wings from the balance linkages vary with variation of the total spring lifting force in such that lifting forces from the ground through the gauge wheels are substantially balanced across the gauge wheels.

Furthermore, the automatic header height control system continues to operate to maintain the sensed distance at a required set value. The set value is selected so that the header is free to float between the bottom stop and the upper limited movement both upwardly and downwardly to accommodate changes in ground height. Thus the distance from the header from the ground is controlled by the gauge wheels and the weight of the header is primarily carried on the suspension of the feeder house. In the event that the set float distance from the bottom stop decreases because the header has moved downwardly relative to the feeder house, the height control mechanism 100 is operated by the automatic height control to lower the feeder house. In the event that the set float distance from the bottom stop increases because the header is moved upwardly relative to the feeder house, the lift mechanism is operated by the automatic height control to raise the feeder house.

Figure 15:
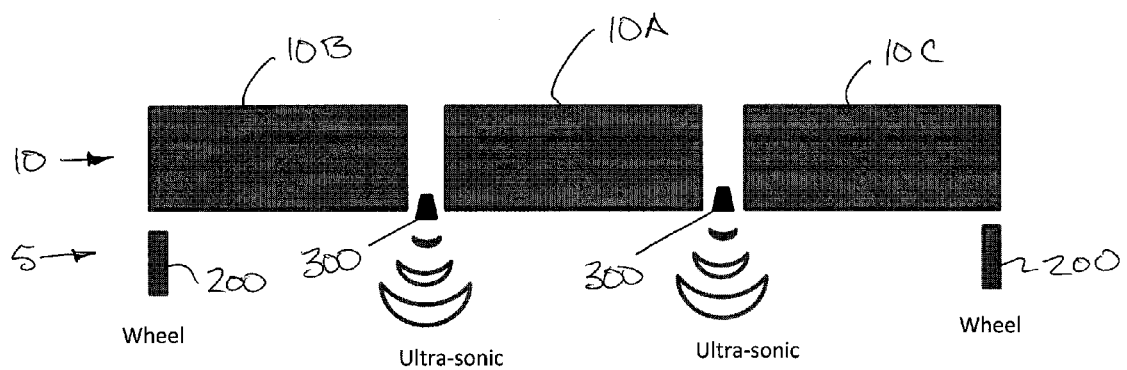
FIG. 15 is a schematic representation of an alternative embodiment of the gauge system according to the present invention.

Turning now to the second embodiment shown in FIG. 15, in this instance, the gauge system according to the present invention again comprises the two outer gauge wheels 200 mounted in the manner described above. The outer gauge wheels however are used with two height sensors 300 instead of the inner gauge wheels 216 in this instance. More particularly, the two height sensors comprised ultrasonic distance sensors mounted on the main frame structure at laterally spaced apart positions in proximity to the center frame section.

In a preferred arrangement, the two height sensors are mounted at laterally opposed ends of the center frame section and are oriented downwardly to measure distance from the respective mounting location on the main frame structure relative to the ground. The sensors provide an active height signal so as to permit monitoring changes in the height of the main frame structure at the measuring locations as the main frame structure moves upwardly and downwardly relative to the ground. The active height signal is proportional to sensed changes in the height of the main frame structure relative to the ground. In this instance, the active height signal is provided as feedback to the automatic header height control in place of the distance signal. Accordingly, the automatic header height control in this instance operates to receive the height signal from the height sensors and acts to raise and lower the feeder house in response to the height signal so as to attempt to maintain the height of the main frame structure at a required set value. Typically, the required set value corresponds to the controlled distance of the outer gauge wheels so that the automatic header height control serves to raise and lower the feeder house of the combine sufficiently to cause the center section of the header frame structure to be supported at the controlled height. The inner ends of the wing frame sections carried on the center frame section are accordingly supported substantially at the controlled height by controlling the height of the center section using the automatic header height control while the outer ends are supported at the controlled height by the outer gauge wheels.

In further embodiments, a controller may be provided which is arranged to receive both the height signal from the height sensors and the distance signal from the distance sensor and which in turn permits the operator to select a mode of operation according to the cut height of the header. When cutting at ground level with the skid element engaged upon the ground, the outer gauge wheels are removed and the controller is switched so that the automatic header height control operates in the usual manner responsive to the distance signal. Alternatively when cutting at a raised height using the outer gauge wheels to support the outer ends of the header at the controlled height, the controller is switched such that the automatic header height control operates responsive to the height signal so that the height of the feeder house is controlled to maintain the center frame section substantially at the controlled height. In this manner, substantially all of the lifting force for the center frame section and the inboard ends of the first and second wing frame sections are provided by the total spring lifting force of the pivot arms. The balance of linkages serve to still permit the total lifting force to be divided between the center lifting force and first and second wing lifting forces distributed between the balance linkages to support the majority of the outboard ends of the wing frame sections on the pivot arms 21 as well. The outer gauge wheels only serve to support a minor portion of the overall weight at the outboard ends of the header structure.

Since various modifications can be made in my invention as herein above described, it is intended that all matter contained in the accompanying specification shall be interpreted as illustrative only and not in a limiting sense.

The invention claimed is:

1. A crop harvesting header comprising:
   a main frame structure extending across a width of the header;
   a mounting assembly for carrying the main frame structure on a propulsion vehicle by which the header is transported in movement in a forward direction generally at right angles to the width across ground including a crop to be harvested;
   a crop receiving table carried on the main frame structure across the width of the header;
   a cutter bar across a front of the table arranged to move over the ground in a cutting action and carrying a sickle knife operable for cutting the crop as the header is moved forwardly across the ground for depositing the crop onto the table;
   a skid element on the main frame structure for engaging the ground so as to receive lifting forces from the ground;
   the skid element located behind the cutter bar and extending along the length of the cutter bar so that the cutter bar is supported adjacent the ground for cutting crop close to the around as the skid element slides over the ground;
   a crop transport system on the table for moving the cut crop toward a discharge location of the header;
   the harvesting header being operable in a first mode of operation with the skid element engaging the ground and the cutter bar adjacent the ground and in a second mode of operation with the skid element and the cutter bar raised away from the ground;

the main frame structure including a center frame portion, a first wing frame portion and a second wing frame portion;

the first wing frame portion being connected to the center frame portion by a first pivot coupling which provides pivotal movement of the first wing frame portion relative to the center frame portion about a first pivot axis extending in a plane parallel to the forward direction;

the first pivot coupling acting to support weight from the first wing frame portion while outboard weight from the first wing frame portion outboard of the first pivot coupling rotates the first wing frame portion about the first pivot coupling in a downward direction;

the second wing frame portion being connected to the center frame portion by a second pivot coupling which provides pivotal movement of the second wing frame portion relative to the center frame portion about a second pivot axis extending in a plane parallel to the forward direction;

the second pivot coupling acting to support weight from the second wing frame portion while outboard weight from the second wing frame portion outboard of the second pivot coupling rotates the second wing frame portion about the second pivot coupling in a downward direction;

the mounting assembly including a float suspension system connected to the center frame portion providing a variable lifting force from the propulsion vehicle acting to support the main frame structure for floating movement relative to the propulsion vehicle;

a first interconnecting float linkage connected between the center frame portion and the first wing frame portion which communicates a first variable lifting force from the center frame portion to the first wing frame portion against the outboard weight of the first wing frame portion;

a second interconnecting linkage connected between the center frame portion and the second wing frame portion which communicates a second variable lifting force from the center frame portion to the second wing frame portion against the outboard weight of the second wing frame portion;

in the first mode of operation with the skid element engaging the ground, the float suspension system and first and second interconnecting linkages provide a downforce from the skid element on the ground which is balanced between the center frame portion and the first and second wing frame portions;

and a gauging system used in the second mode of operation comprising:

a first ground engaging member supported on the first wing frame portion at a location spaced outwardly from the center frame portion for engaging the ground so as to receive lifting forces from the ground;

a second ground engaging member supported on the second wing frame portion at a location spaced outwardly from the center frame portion for engaging the ground so as to receive lifting forces from the ground; and at least one additional ground engaging member supported on the main frame structure proximate the center frame portion for engaging the ground so as to receive lifting forces from the ground;

in the second mode of operation, the first, second and at least one additional ground engaging members collectively supporting the skid element spaced above the ground while the first and second wing frame portions pivot relative to the center frame portion in response to changes in ground height.

2. The crop harvesting header according to claim 1 wherein at least one of the ground engaging members comprises:

an elongate support member connected at a forward end adjacent to and rearwardly of the cutter bar for pivotal movement about an axis parallel to the cutter bar and extending rearwardly therefrom;

the elongate support member extending rearwardly under the table to a rear end rearward of the table;

an upstanding extendible member connected at a lower end to the elongate support member and to the frame structure above the lower end and rearward of the table;

the extendible member being operable to extend the lower end relative to the frame to raise and lower the surface relative to the table to raise and lower the cutter bar relative to the ground;

the surface being mounted relative to the elongate support member so that the surface engages the ground at a position forward of a rear end of the table.

3. The crop harvesting header according to claim 1 wherein the main frame structure includes a frame beam and a plurality of frame members located at spaced positions across the main frame structure;

each frame member extending from the frame beam in a first portion downwardly behind the table and in a second portion forwardly under the table to support the cutter bar;

the second portion forming a channel member with a downwardly facing open face;

said at least one additional ground engaging member having a ground engaging surface engaging the ground at a position rearwardly of the cutter bar;

the ground engaging surface in the second mode of operation maintaining the cutter bar and the skid element supported away from the ground;

the ground engaging member being carried on a mounting assembly comprising an elongate support member connected at a forward end adjacent to and rearwardly of the cutter bar for pivotal movement about an axis parallel to the cutter bar and extending rearwardly therefrom;

the elongate support member being located in a second portion of a respective one of said frame members and extending rearwardly under the table;

the surface being mounted relative to the elongate support member so that the surface engages the ground at a position forward of a rear end of the table.

4. The crop harvesting header according to claim 3 wherein each of the first and second wing frame portions includes a plurality of said frame members and wherein said first and second ground engaging members are mounted at respective outer ends of the first and second wing frame portions and said at least one additional ground engaging member comprises a first additional ground engaging member in a first frame member of the first wing frame portion closest to the pivot axis and a second additional ground engaging member in a first frame member of the second wing frame portion closest to the pivot axis, and wherein the center frame portion is supported only by said float suspension system and not by any one of said additional ground engaging members.

5. The crop harvesting header according to claim 1 wherein said first and second ground engaging members are mounted at respective outer ends of the first and second wing frame portions said at least one additional ground engaging member comprises a first additional ground engaging member is mounted on the first wing frame portion closely adjacent to the pivot axis and a second additional ground engaging member is mounted on the second wing frame portion closely adjacent the pivot axis, and wherein the center frame portion is supported only by said float suspension system and not by any one of said additional ground engaging members.

6. The crop harvesting header according to claim 1 wherein each of the ground engaging surfaces is located under the table.

7. The crop harvesting header according to claim 1 wherein each of the ground engaging surfaces comprises an outer periphery of a wheel rotatable about an axis parallel to the cutter bar.

8. The crop harvesting header according to claim 7 wherein the wheel rotates about an axis located forwardly of a rear edge of the table.

9. The crop harvesting header according to claim 7 wherein the wheel comprises a pair of wheels mounted on respective sides of an elongate support member.

10. A crop harvesting header for attachment to a combine harvester comprising:
a main frame structure extending across a width of the header;
a mounting assembly for carrying the main frame structure on a feeder house of the combine harvester by which the header is transported in movement in a forward direction generally at right angles to the width across ground including a crop to be harvested;
the mounting assembly including an adapter for mounting on the feeder house so as to be raised and lowered with the feeder house relative to the combine harvester and a suspension system connected between the main frame structure and the adapter such that the main frame structure is movable upwardly and downwardly relative to the adapter;
a crop receiving table carried on the main frame structure across the width of the header;
a cutter bar across a front of the table arranged to move over the ground in a cutting action and carrying a sickle knife operable for cutting the crop as the header is moved forwardly across the ground for depositing the crop onto the table;
a skid element on the main frame structure for engaging the ground so as to receive lifting forces from the ground;
the skid element located behind the cutter bar and extending along the length of the cutter bar so that the cutter bar is supported adjacent the ground for cutting crop close to the ground as the skid element slides over the ground;
a crop transport system on the table for moving the cut crop toward a discharge location of the header;
the harvesting header being operable in a first mode of operation with the skid element engaging the ground and the cutter bar adjacent the ground and in a second mode of operation with the skid element and the cutter bar raised away from the ground;
the main frame structure including a center frame portion, a first wing frame portion and a second wing frame portion;
the first wing frame portion being connected to the center frame portion by a first pivot coupling which provides pivotal movement of the first wing frame portion relative to the center frame portion about a first pivot axis extending in a plane parallel to the forward direction;
the first pivot coupling acting to support weight from the first wing frame portion while outboard weight from the first wing frame portion outboard of the first pivot coupling rotates the first wing frame portion about the first pivot coupling in a downward direction;
the second wing frame portion being connected to the center frame portion by a second pivot coupling which provides pivotal movement of the second wing frame portion relative to the center frame portion about a second pivot axis extending in a plane parallel to the forward direction;
the second pivot coupling acting to support weight from the second wing frame portion while outboard weight from the second wing frame portion outboard of the second pivot coupling rotates the second wing frame portion about the second pivot coupling in a downward direction;
the suspension system including at least one spring connected between the main frame structure and the adapter so as to provide a variable spring lifting force acting to support the main frame structure for floating movement relative to the combine harvester;
the mounting assembly including a center support assembly which communicates from the total spring lifting force of the suspension system a center lifting force against the weight of the center frame portion and weight from the first wing frame portion at the first pivot coupling and weight from the second wing frame portion at the second pivot coupling;
a first interconnecting float linkage connected between the center frame portion and the first wing frame portion which communicates a first variable lifting force from the center frame portion to the first wing frame portion against the outboard weight of the first wing frame portion;
a second interconnecting linkage connected between the center frame portion and the second wing frame portion which communicates a second variable lifting force from the center frame portion to the second wing frame portion against the outboard weight of the second wing frame portion;
in the first mode of operation with the skid element engaging the ground, the float suspension system and first and second interconnecting linkages provide a downforce from the skid element on the ground which is balanced between the center frame portion and the first and second wing frame portions;
a distance sensor for sensing changes in distance between a point on the main frame structure and a point on the adapter as the main frame structure moves upwardly and downwardly relative to the adapter and for generating an active distance signal proportional to the sensed changes in said distance;
an automatic header height control system which receives the distance signal from the distance sensor and acts to raise and lower the feeder house in response to the distance signal from the distance sensor so as to raise and lower the feeder house relative to the main frame structure and attempt to maintain said distance at a required set value in a first mode of operation of the header; and a gauging system comprising:
- a first ground engaging member supported on the first wing frame portion at a location spaced outwardly from the center frame portion for engaging the ground so as to receive lifting forces from the ground;
- a second ground engaging member supported on the second wing frame portion at a location spaced outwardly from the center frame portion for engaging the ground so as to receive lifting forces from the ground; and
- at least one height sensor supported on the main frame structure proximate the center frame portion for sensing changes in height of the main frame structure from the ground at a location of said at least one height sensor as the main frame structure moves upwardly and downwardly relative to the ground and for generating an active height signal proportional to the sensed changes in said height;
- the height signal being receivable by the automatic header height control such that the automatic header height control acts to raise and lower the feeder house in response to the height signal from said at least one sensor so as to raise and lower the feeder house relative to the main frame structure and attempt to maintain said height at a required set value corresponding to said controlled distance of the outer gauge wheels in the second mode of operation of the header.

11. The crop harvesting header according to claim 10 wherein said at least one height sensor comprises two height sensors supported at transversely spaced positions on the main frame structure and wherein the active height signal represents an overall height proportional to an average of the height sensed by each sensor.

12. The crop harvesting header according to claim 11 wherein the two height sensors are supported on the center frame portion of the main frame structure.

13. The crop harvesting header according to claim 11 wherein the two height sensors are supported on the first wing frame portion and the second wing frame portion respectively.

14. The crop harvesting header according to claim 10 wherein each of the ground engaging surfaces is located under the table.

15. The crop harvesting header according to claim 10 wherein each of the ground engaging surfaces comprises an outer periphery of a wheel rotatable about an axis parallel to the cutter bar.

16. The crop harvesting header according to claim 15 wherein the wheel rotates about an axis located forwardly of a rear edge of the table.

17. The crop harvesting header according to claim 15 wherein the wheel comprises a pair of wheels mounted on respective sides of an elongate support member.

18. A crop harvesting header comprising
- a main frame structure extending across a width of the header;
- a mounting assembly for carrying the main frame structure on a propulsion vehicle for movement in a forward direction generally at right angles to the width across ground including a crop to be harvested;
- a crop receiving table carried on the main frame structure across the width of the header;
- a cutter bar across a front of the table arranged to move over the ground in a cutting action and carrying a sickle knife operable for cutting the crop as the header is moved forwardly across the ground for depositing the crop onto the table;
- a skid element on the main frame structure for engaging the ground so as to receive lifting forces from the ground;
- the skid element located behind the cutter bar and extending along the length of the cutter bar so that the cutter bar is supported adjacent the ground for cutting crop close to the ground as the skid element slides over the ground;
- a crop transport system on the table for moving the cut crop toward a discharge location of the header;
- the harvesting header being operable in a first mode of operation with the skid element engaging the ground and the cutter bar adjacent the ground and in a second mode of operation with the skid element and the cutter bar raised away from the ground;
- the main frame structure including a frame beam and a plurality of downwardly and forwardly extending members extending from the frame beam to support the cutter bar;
- and at least one ground engaging member having a surface engaging the ground at a position rearwardly of the cutter bar and, in the second mode of operation, maintaining the cutter bar and the skid element supported away from the ground;
- the ground engaging member being carried on a mounting assembly comprising:
  - an elongate support member connected at a forward end adjacent to and rearwardly of the cutter bar for pivotal movement about an axis parallel to the cutter bar and extending rearwardly therefrom;
  - the elongate support member extending rearwardly under the table to a rear end rearward of the table;
  - an upstanding extendible member connected at a lower end to the elongate support member and to the frame structure above the lower end and rearward of the table;
  - the extendible member being operable to extend the lower end relative to the frame to raise and lower the surface relative to the table to raise and lower the cutter bar relative to the ground;
  - the surface being mounted relative to the elongate support member so that the surface engages the ground at a position forward of a rear end of the table.

19. The crop harvesting header according to claim 18 wherein the surface comprises an outer periphery of a wheel rotatable about an axis parallel to the cutter bar.

20. The crop harvesting header according to claim 19 wherein the wheel rotates about an axis located forwardly of a rear edge of the table.

21. The crop harvesting header according to claim 19 wherein the wheel comprises a pair of wheels mounted on respective sides of the elongate support member.

22. The crop harvesting header according to claim 18 wherein the frame structure comprises a center frame portion and two wing frame portions each carried at a respective end of the center frame portion and pivotal relative thereto about an axis longitudinal of a direction of working operation so that the wing frame portions can move upwardly and downwardly relative to the center frame portion and wherein there are provided four ground engaging members including two outer ground engaging gauge members mounted at respective outer ends of the wing frame portions and two inner ground engaging member mounted on the wing frame portions inwardly of the outer ends.

23. A crop harvesting header comprising
a main frame structure extending across a width of the header;
a mounting assembly for carrying the main frame structure on a propulsion vehicle for movement in a forward direction generally at right angles to the width across ground including a crop to be harvested;
a crop receiving table carried on the main frame structure across the width of the header;
a cutter bar across a front of the table arranged to move over the ground in a cutting action and carrying a sickle knife operable for cutting the crop as the header is moved forwardly across the ground for depositing the crop onto the table;
a skid element on the main frame structure for engaging the ground so as to receive lifting forces from the ground;
the skid element located behind the cutter bar and extending along the length of the cutter bar so that the cutter bar is supported adjacent the ground for cutting crop close to the ground as the skid element slides over the ground;
a crop transport system on the table for moving the cut crop toward a discharge location of the header;
the harvesting header being operable in a first mode of operation with the skid element engaging the ground and the cutter bar adjacent the ground and in a second mode of operation with the skid element and the cutter bar raised away from the ground;
the main frame structure including a frame beam and a plurality of frame members located at spaced positions across the main frame structure;
each frame member extending from the frame beam in a first portion downwardly behind the table and in a second portion forwardly under the table to support the cutter bar;
the second portion forming a channel member with a downwardly facing open face;
and at least one ground engaging member having a ground engaging surface engaging the ground at a position rearwardly of the cutter bar;
the ground engaging surface in the second mode of operation maintaining the cutter bar and the skid element supported away from the ground;
the ground engaging member being carried on a mounting assembly comprising an elongate support member connected at a forward end adjacent to and rearwardly of the cutter bar for pivotal movement about an axis parallel to the cutter bar and extending rearwardly therefrom;
the elongate support member being located in a second portion of a respective one of said frame members and extending rearwardly under the table;
the surface being mounted relative to the elongate support member so that the surface engages the ground at a position forward of a rear end of the table.

24. The crop harvesting header according to claim 23 wherein the surface comprises an outer periphery of a wheel rotatable about an axis parallel to the cutter bar.

25. The crop harvesting header according to claim 24 wherein the wheel rotates about an axis located forwardly of a rear edge of the table.

26. The crop harvesting header according to claim 24 wherein the wheel comprises a pair of wheels mounted on respective sides of the elongate support member.

27. The crop harvesting header according to claim 23 wherein the frame structure comprises a center frame portion and two wing frame portions each carried at a respective end of the center frame portion and pivotal relative thereto about an axis longitudinal of a direction of working operation so that the wing frame portions can move upwardly and downwardly relative to the center frame portion and wherein there are provided four ground engaging members including two outer ground engaging gauge members mounted at respective outer ends of the wing frame portions and two inner ground engaging member mounted on the wing frame portions inwardly of the outer ends.

* * * * *